(12) United States Patent
Wakai et al.

(10) Patent No.: US 6,602,034 B2
(45) Date of Patent: Aug. 5, 2003

(54) ANCHOR FOR BOARDS AND METHOD FOR MANUFACTURING THE SAME

(75) Inventors: Takao Wakai, Osaka (JP); Takashi Kiyama, Osaka (JP)

(73) Assignee: Wakai & Co., Ltd., Osaka (JP)

( * ) Notice: Subject to any disclaimer, the term of this patent is extended or adjusted under 35 U.S.C. 154(b) by 0 days.

(21) Appl. No.: 10/180,006

(22) Filed: Jun. 26, 2002

(65) Prior Publication Data

US 2003/0002951 A1 Jan. 2, 2003

(30) Foreign Application Priority Data

| Jun. 29, 2001 | (JP) | ........................................ 2001-237160 |
| Jul. 24, 2001 | (JP) | ........................................ 2001-258789 |

(51) Int. Cl.⁷ ................................................ F16B 13/04
(52) U.S. Cl. .............................. 411/37; 411/38; 411/55; 411/903; 411/908; 470/2
(58) Field of Search ................................ 411/34, 36, 37, 411/38, 55, 59, 903, 907, 908; 470/2, 5

(56) References Cited

U.S. PATENT DOCUMENTS

| 3,091,990 A | | 6/1963 | McVittie | |
| 3,174,387 A | * | 3/1965 | Fischer | ........................ 411/37 |
| 3,479,081 A | * | 11/1969 | Schaaf | .................... 411/38 X |
| 4,416,572 A | * | 11/1983 | Black | .......................... 411/38 |
| 4,478,544 A | * | 10/1984 | Strand | ........................ 411/34 |

FOREIGN PATENT DOCUMENTS

| EP | 0 866 229 | 9/1998 |
| EP | 0 874 166 | 10/1998 |
| GB | 2 018 928 | 10/1979 |

* cited by examiner

*Primary Examiner*—Neill Wilson
(74) *Attorney, Agent, or Firm*—Wenderoth, Lind & Ponack, L.L.P.

(57) ABSTRACT

An anchor for boards is provide which comprises a socket including a tubular portion, a plurality of split pieces integral with the tubular portion and having intermediate portions slightly bent outwardly, the socket being integrally provided with a flange at one end thereof and a nut member at the other end thereof, and a screw inserted into the socket and threaded into the nut member. The split pieces have their outer peripheral surfaces covered with a resilient member. Also, a method for manufacturing the anchor is provided.

4 Claims, 5 Drawing Sheets

ANCHOR FOR BOARDS AND METHOD FOR MANUFACTURING THE SAME

BACKGROUND OF THE INVENTION

The present invention relates to an anchor for boards for mounting an instrument or tool to a building material which does not provide screw retaining force such as a plasterboard or a sheet of plywood, or to a wall surface to the back of which hands cannot reach.

In a situation in which the building material itself is too thin and weak to mount a tool or instrument by directly tightening a screw, metal anchors are widely used. By tightening a screw, its leg portion spreads in all directions. Thus an operator can work on the front side only by forming a starting hole in the wall.

In such known anchors for boards, a screw is tightened from the operator's side to spread the leg portion on the backside of the wall surface, thereby fixing the anchor to the board. After removing the screw, an article to be fastened is fixed by retightening the screw. After the article has been mounted, if a load is applied to the article, the leg portion of the anchor for boards abuts the back of the wall. Since the plasterboard is formed by hardening plaster and covering it with paper, as shown in FIG. 8, the leg portion of the anchor may tear the paper on the back of the wall and sink into the plasterboard. Thus, due to breakage of the plasterboard, the article mounted may loosen or become shaky.

An object of the present invention is to provide an anchor for boards which prevents loosening and shaking, which will not break plasterboards, and which is easy to manufacture.

SUMMARY OF THE INVENTION

According to the present invention, there is provided an anchor for boards, comprising a socket including a tubular portion, a plurality of split pieces integral with the tubular portion and having intermediate portions slightly bent outwardly, the socket being integrally provided with a flange at one end thereof and a nut member at the other end thereof, and a screw inserted into the socket and threaded into the nut member, wherein the split pieces have their outer peripheral surfaces covered with a resilient member.

According to the present invention, the socket is inserted into the resilient member and the resilient member is made to contact with the socket.

According to the present invention, the resilient member is formed with as many slits as the split pieces so that portions of the resilient member disposed between the slits align with the split pieces.

The resilient member may be made of a heat-shrinkable resin.

From another aspect of the invention, there is provided a method of manufacturing the anchor for boards, comprising the steps of: providing a socket including a tubular portion, a plurality of split pieces integral with the tubular portion and having intermediate portions slightly bent outwardly, the socket being integrally provided with a flange at one end thereof and a nut member at the other end thereof; inserting a screw into the socket and threading the screw into the nut member; cutting the resilient member to a suitable length beforehand, inserting the socket into the resilient member so that the split pieces will be covered by the resilient member; and heating the resilient member to heat-shrink the resilient member onto the split pieces to cover outer peripheral surfaces of the split pieces.

From another aspect of the invention, there is provided a method of manufacturing the anchor for boards, comprising the steps of: providing a socket including a tubular portion, a plurality of split pieces integral with the tubular portion and having intermediate portions slightly bent outwardly, the socket being integrally provided with a flange at one end thereof and a nut member at the other end thereof; inserting a screw into the socket and threading the screw into the nut member; inserting the socket into the resilient member so as to cover the split pieces; cutting the resilient member to a suitable length; and heating the resilient member to heat-shrink the resilient member onto the split pieces to cover outer peripheral surfaces of the split pieces.

With this anchor for boards, since the metallic spread portion having a plurality of split pieces has its outer periphery covered with resin, due to its resilience, the resin acts as a buffer between the plasterboard and the metallic spread portion of the anchor. Thus, the anchor for boards according to the present invention will not damage the plasterboard, and the member to be mounted can be reliably fixed to the wall.

According to the method for manufacturing the anchor for boards, such anchors can be mass-produced easily.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

The embodiments of the present invention will be described below with reference to the drawings.

Figure 1:
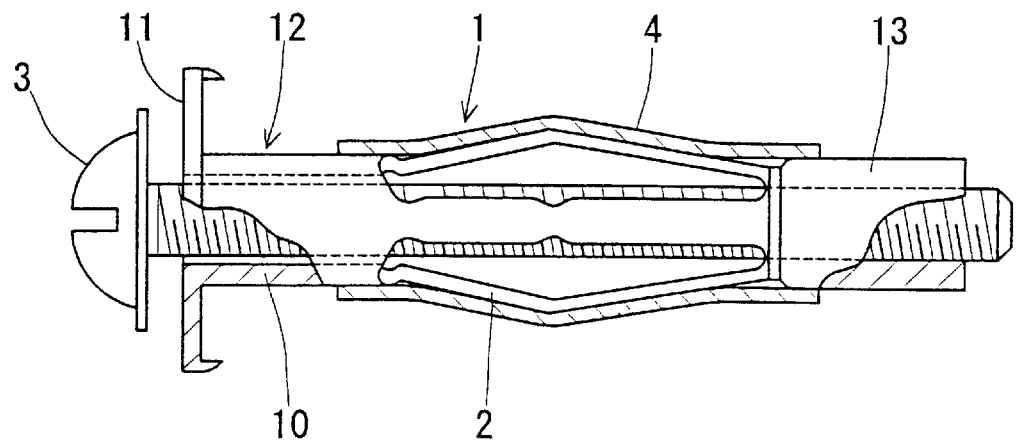
FIG. 1 is a front view of a first embodiment of a metal anchor.

FIG. 1 shows an embodiment of the anchor 1 embodying the present invention. It comprises a socket 12 and a screw 3 inserted through the socket. The socket 12 has a tubular portion 10 integral with plurality of slightly outwardly bent split pieces 2. The split pieces 2 form leg portions when spread. The split pieces 2 have their outer peripheral surfaces covered with a resilient resin member 4 of a heat-shrinkable material such as resin. The socket 12 has a flange 11 at one end and a nut member 13 with female threads at the other end. If a viscous resin is applied as the resilient resin, it may be applied not only to the outer peripheral surfaces of the split pieces 2, but also to the inner peripheral surfaces thereof.

Figure 2:
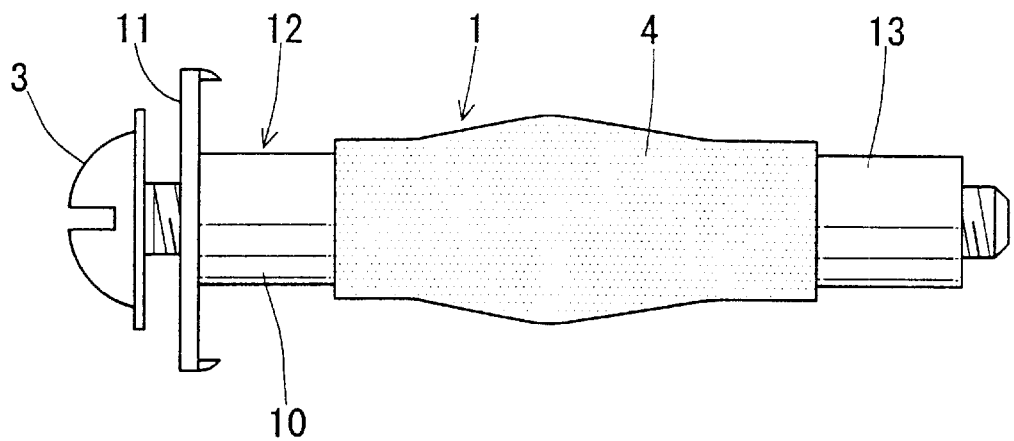
FIG. 2 is a front view of a second embodiment.

FIG. 2 shows a second embodiment in which the socket 12 has its outer periphery covered with a thin resilient resin member 4. Slits may be formed in the resilient resin member 4 along the split pieces 2. As the split pieces 2 spread, the resilient member 4 follows the spreading of the split pieces 2 to keep covering their surfaces. As long as the resilient member 4 does not hinder spreading of the split pieces 2 and is finally sandwiched between the back of the plasterboard 7 and the split pieces 2 to act as a buffer, its shape is not restricted.

Figure 3:
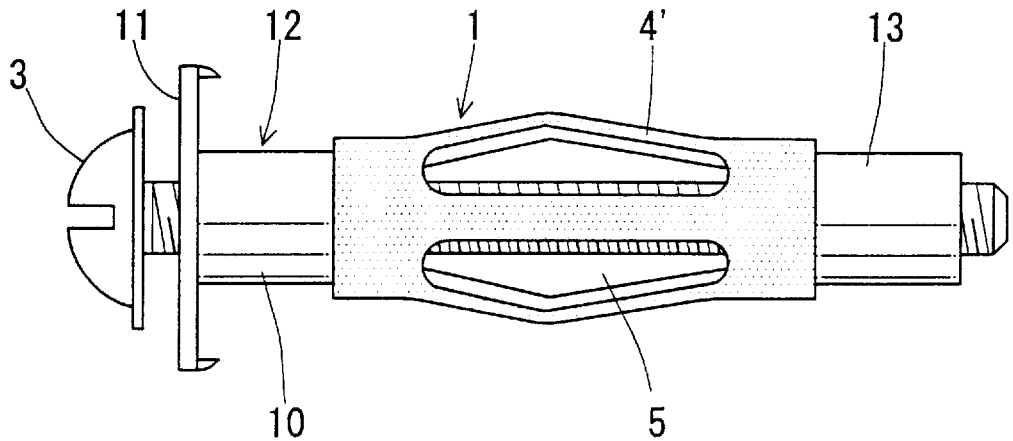
FIG. 3 is a front view of a third embodiment.

FIG. 3 shows a third embodiment. The socket 12 has its outer periphery covered with a strong resilient member 4' formed with slits 5 along the split pieces 2 in such a shape as to follow their spreading and cover their outer peripheral surfaces.

Figure 4:
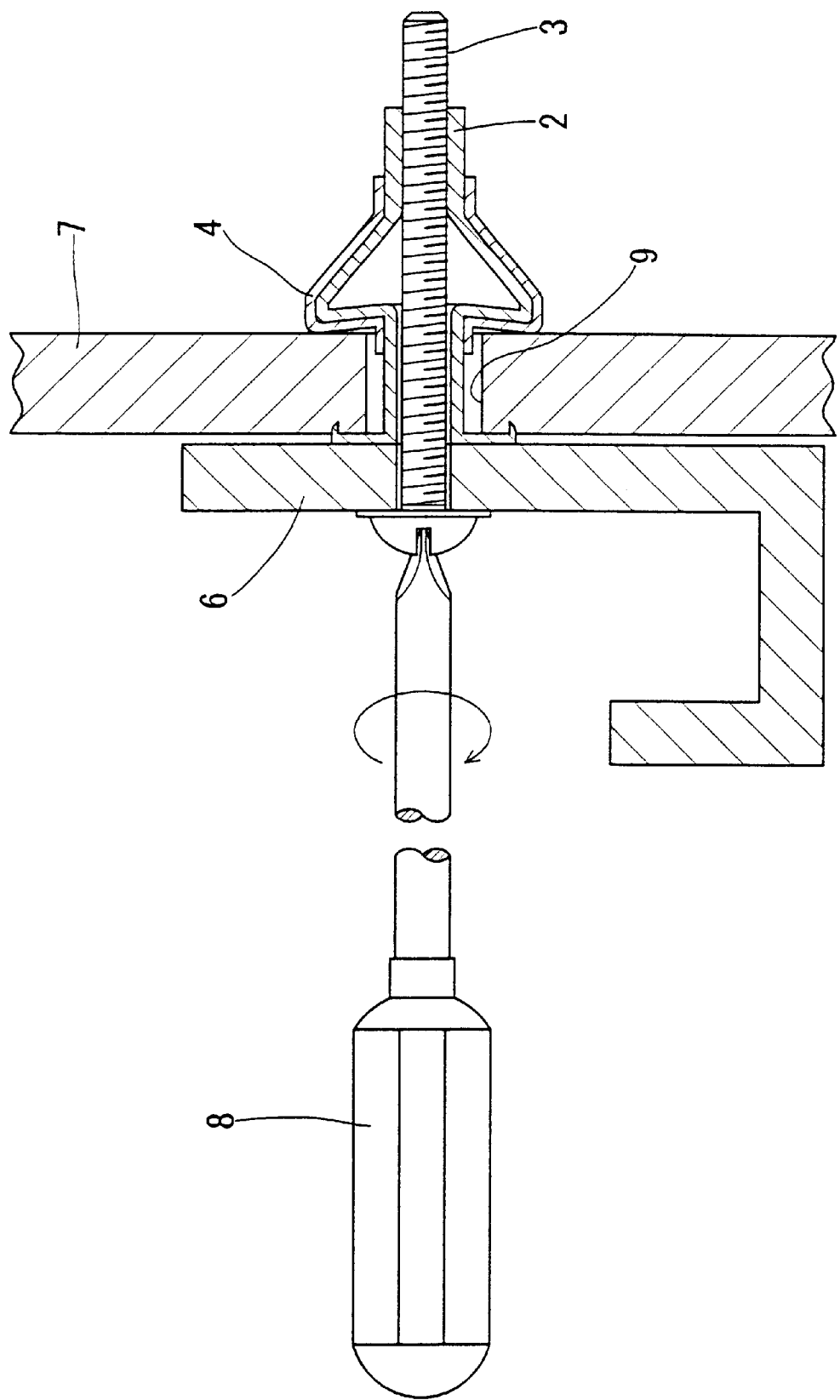
FIG. 4 is a view showing how the anchor according to the present invention is used.

FIG. 4 shows how the anchor 1 according to the present invention is used. A starting hole 9 having a predetermined diameter is formed in a plasterboard 7 beforehand. The anchor 1 is inserted into the hole 9. When the screw 3 is tightened, the split pieces 2 will be spread. When they spread, the screw 3 is turned in a reverse direction and removed. Then, with an article 6 to be mounted in position, the screw 3 is set and retightened with a tool 8.

Figure 5:
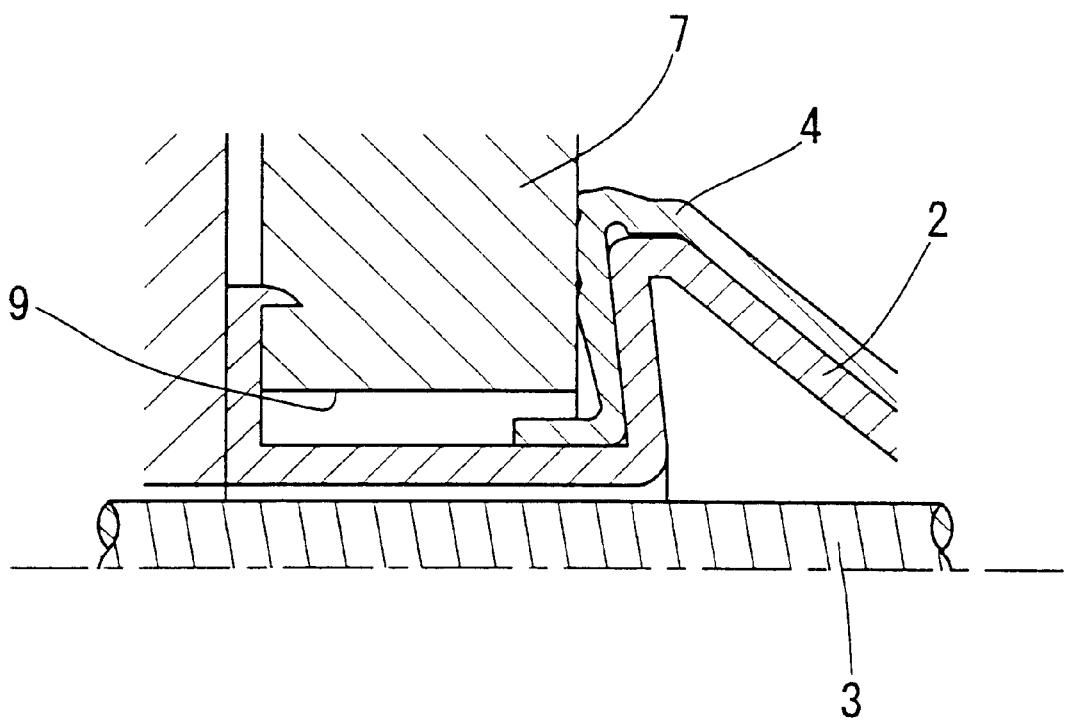
FIG. 5 is a partial enlarged view of the arrangement shown in FIG. 4.

FIG. 5 is a partial enlarged view of FIG. 4, showing how the resilient member 4 is partially held between the split pieces 2 and the plasterboard 7 to perform a buffering function.

Figure 6:
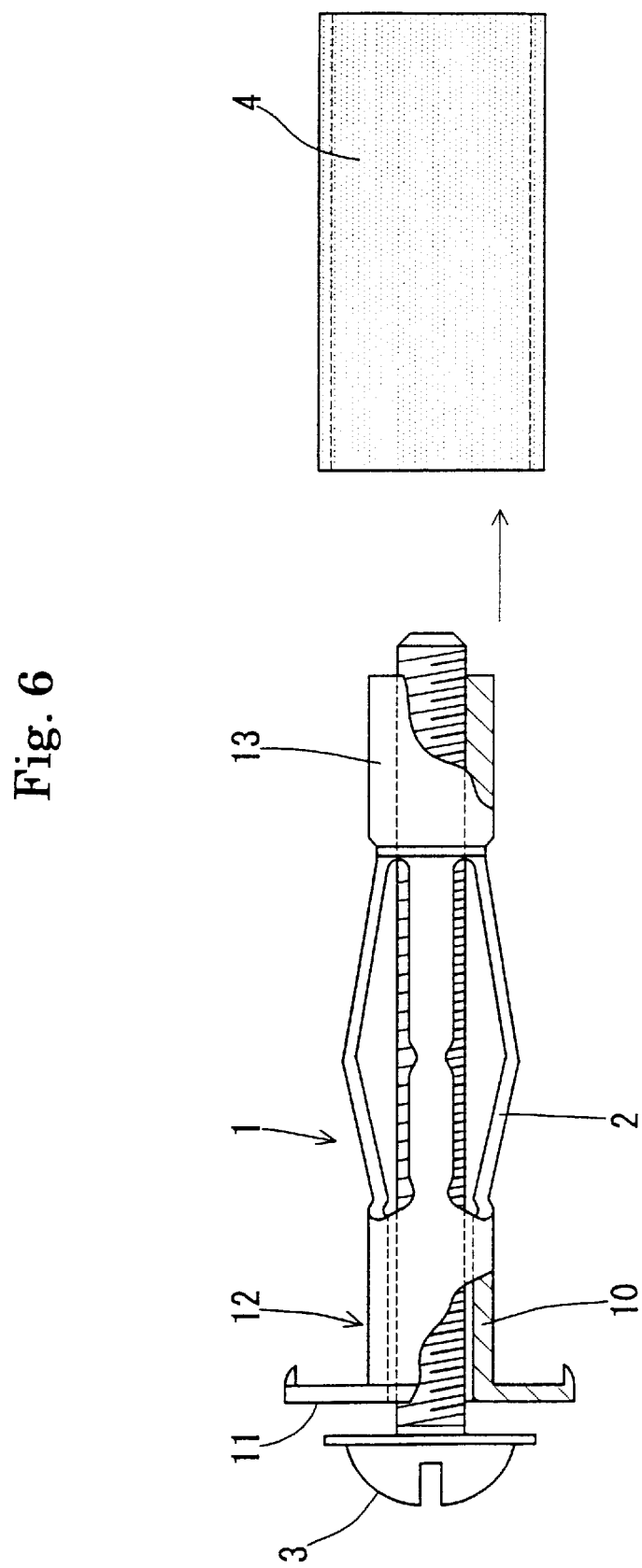
FIG. 6 is a view showing a step of inserting the anchor into a resilient member.
Figure 7:
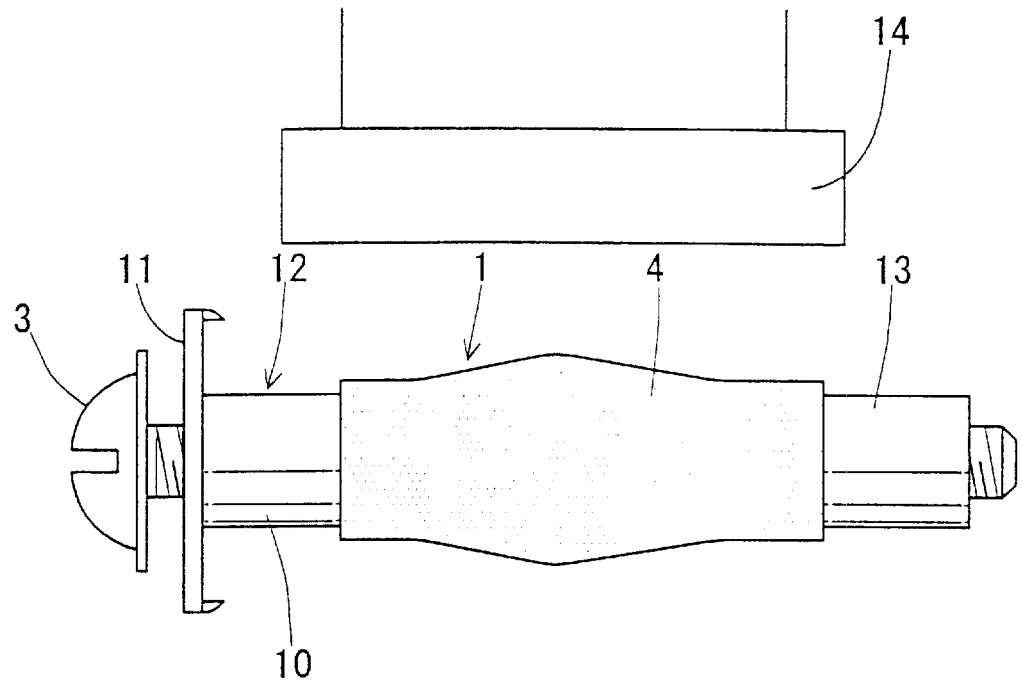
FIG. 7 is a view showing a step of heat-shrinking the resilient member after insertion.
Figure 8:
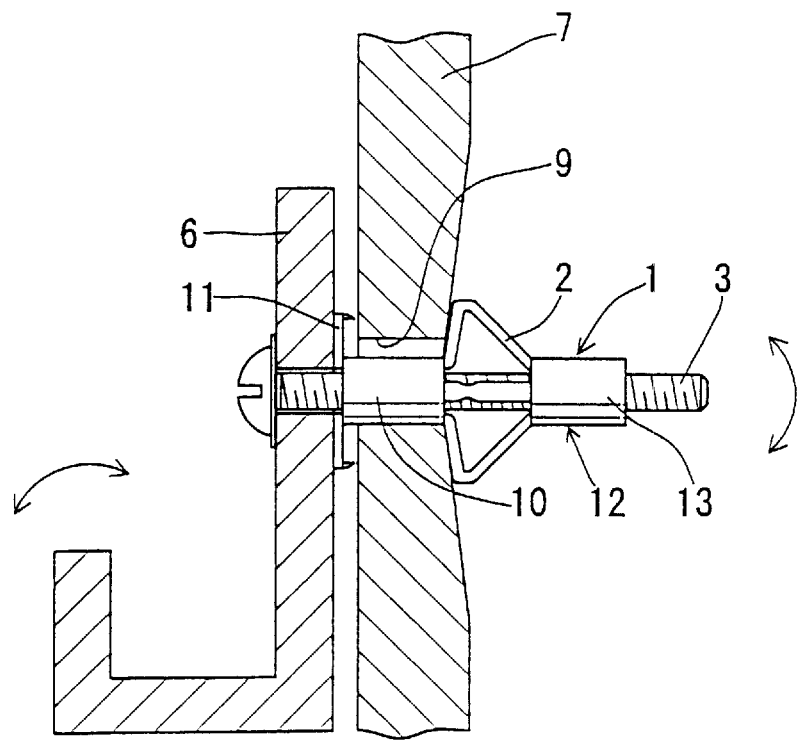
FIG. 8 is a view showing how a conventional anchor is used.

FIGS. 6 and 7 show one embodiment of the method according to the present invention. In this method, a hollow heat-shrinkable resilient member 4 having a larger inner diameter than the outer diameter of the socket 12 is cut to suitable lengths. The anchor 1 is inserted into the resilient member 4' so as to cover the split pieces 2. Then it is heated using a heating means 14 such as a heater or a hot air fan to heat-shrink the resilient member 4 so that it will coat the outer peripheral surfaces of the split pieces 2 of the anchor. With this arrangement, the socket 12 has its outer periphery covered by the resilient member 4. The resilient member allows the spreading of the leg portion and keeps covering their outer peripheral surfaces.

Instead of cutting the resilient member beforehand, while the anchor is inserted into a long resilient member, the resilient member may be cut to a suitable length corresponding to the length of the anchor and be heated. The anchor having the resilient member thereon may be passed through a heated environment for a predetermined period of time by a continuous feed device.

According to the present invention, due to the function of the resilient member which acts as a buffer between the soft plasterboard and the hard metal anchor, it is possible to avoid breakage of the plasterboard and prevent loosening or shaking of the article mounted. According to the present invention, the buffer portion is disposed between the anchor and the plasterboard, thereby imparting shrinkability and flexibility. This substantially increases the resistance to load.

By the method of manufacturing the anchor according to the present invention, such anchors can be easily mass-produced.

What is claimed is:

1. An anchor for boards, comprising a socket including a tubular portion, a plurality of split pieces integral with said tubular portion and having intermediate portions slightly bent outwardly, said socket being integrally provided with a flange at one end thereof and a nut member at the other end thereof, and a screw inserted into said socket and threaded into said nut member, said split pieces having their outer peripheral surfaces covered with a resilient member, wherein said resilient member is formed with as many slits as said split pieces so that portions of said resilient member disposed between the slits align with said split pieces.

2. An anchor for boards, comprising a socket including a tubular portion, a plurality of split pieces integral with said tubular portion and having intermediate portions slightly bent outwardly, said socket being integrally provided with a flange at one end thereof and a nut member at the other end thereof; and a screw inserted into said socket and threaded into said nut member, said split pieces having their outer peripheral surfaces covered with a resilient member, wherein said resilient member is made of a heat-shrinkable resin.

3. A method of manufacturing an anchor for boards, said method comprising:

providing a socket including a tubular portion, and a plurality of split pieces integral with said tubular portion and having intermediate portions slightly bent outwardly, said socket being integrally provided with a flange at one end thereof and a nut member at the other end thereof;

inserting a screw into said socket and threading said screw into said nut member;

cutting a resilient member, made of a heat-shrinkable resin, to a suitable length beforehand;

inserting the socket into said resilient member so that said split pieces will be covered by said resilient member; and heating said resilient member to heat-shrink said resilient member onto said split pieces to cover outer peripheral surfaces of said split pieces.

4. A method of manufacturing an anchor for boards, said method comprising:

providing a socket including a tubular portion, and a plurality of split pieces integral with said tubular portion and having intermediate portions slightly bent outwardly, said being integrally provided with a flange at one end thereof and a nut member at the other end thereof;

inserting a screw into said.socket and threading, said screw into said nut member;

inserting the socket into a resilient member, made of a heat-shrinkable resin, so as to cover said split pieces;

cutting said resilient member to a suitable length; and heating said resilient member to heat-shrink said resilient member onto said split pieces to cover outer peripheral surfaces of said split pieces.

* * * * *